Patented Mar. 2, 1943

2,312,692

UNITED STATES PATENT OFFICE 2,312,692

TRIAZINE DERIVATIVES

Gaetano F. D'Alelio, Pittsfield, Mass., assignor to General Electric Company, a corporation of New York No Drawing. Application November 1, 1941, Serial No. 417,504

14 Claims. (Cl. 260—248)

This invention relates to new chemical compounds and more particularly to triazine derivatives. The invention especially is concerned with the production of new and useful triazinyl sulfamyl-carbocyclic-carbamyl-alkyl sulfides and triazinyl sulfamyl-carbocyclic-thiocarbamyl-alkyl sulfides.

The triazine derivatives of this invention may be represented graphically by the following general formula:

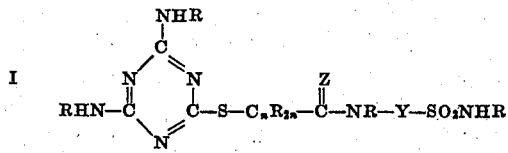

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halo-hydrocarbon radicals. Since $n$ represents an integer which is 1 or 2, it will be seen that the linkage of the sulfamyl-carbocyclic-carbamyl-alkyl or sulfamyl-carbocyclic-thiocarbamyl-alkyl grouping to the sulfur atom in all cases will be alpha or beta to the sulfamyl-carbocyclic-carbamyl or thiocarbamyl grouping. It also will be observed that linkage of the triazinyl grouping to the sulfur atom is through a carbon atom.

Illustrative examples of radicals which R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or zenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, etc. Preferably R in Formula I is hydrogen. However, there also may be produced in accordance with the present invention chemical compounds such, for instance, as those represented by the general formulas:

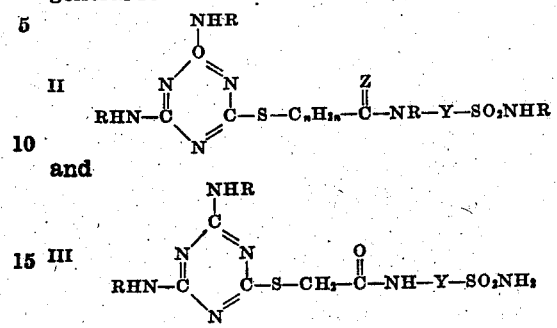

where $n$, Z, Y and R have the same meanings as above given with reference to Formula I.

Illustrative examples of divalent carbocyclic radicals which Y in Formulas I, II and III may represent are: arylene, e. g., phenylene, xenylene, naphthylene, etc.; alkarylene, e. g., 1,4-tolylene, para-(2,3-xylylene), etc.; cycloalkylene, e. g., cyclopentylene, cyclohexylene, etc.; cycloalkenylene, e. g., cyclopentenylene, cyclohexenylene, etc.; and their homologues, as well as those divalent carbocyclic radicals with one or more of their hydrogen atoms replaced by a substituent, e. g., halogeno, amino, acetyl, acetoxy, carbalkoxy, alkoxy, aryloxy, hydroxy, alkyl, alkenyl, etc. Specific examples of substituted divalent carbocyclic radicals are chlorophenylene, bromophenylene, chloronaphthylene, bromonaphthylene, bromo 1,4-tolylene, chlorocyclopentylene, chlorocyclopentenylene, carbmethoxyphenylene, ethoxyphenylene, acetophenylene, acetoxyphenylene, bromocyclopentylene, aminophenylene, phenoxyphenylene, hydroxyphenylene, methylphenylene (tolylene), allylphenylene, etc. Preferably Y is phenylene or methylphenylene.

The new compounds of this invention may be used as chemotherapeutic agents and as intermediates in the preparation of derivatives thereof such as ureido, hydrazino, acyl, carbamyl, amidine, etc., derivatives of the individual diamino triazinyl sulfamyl-carbocyclic-carbamyl (or thiocarbamyl)-alkyl sulfide. These new organic sulfides are especially valuable in the preparation of synthetic resinous compositions. Thus, they may be condensed with, for instance, aldehydes, including polymeric aldehydes and aldehyde-addition products, to yield condensation products of particular utility in the plastics and coating arts. Such condensation products are more fully described and claimed in my co-pending application Serial No. 417,502, filed Nov. 11, 1941, and assigned to the same assignee as the present invention. These new organic sulfides also may be compounded with rubber, both natural and synethetic, to modify the properties of the rubber.

Various methods may be employed to produce the chemical compounds of this invention. I prefer to prepare them by effecting reaction between a diamino [(-NHR)₂] mercapto symmetrical triazine (s-triazine) and a sulfamyl-carbocyclic-carbamyl (or triocarbamyl)-alkyl halide in the presence of a hydrohalide acceptor. Illustrative examples of mercapto diamino s-triazines that may be used, depending upon the particular sulfide desired, are:

2-mercapto 4,6-diamino s-triazine (4-mercapto 2,6-diamino s-triazine; 6-mercapto 2,4-diamino s-triazine)
2-mercapto 4,6-di-(methylamino) s-triazine
2-mercapto 4,6-di-(anilino) s-triazine
2-mercapto 4-amino 6-ethylamino s-triazine
2-mercapto 4,6-di-(propylamino) s-triazine
2-mercapto 4-allylamino 6-butylamino s-triazine
2-mercapto 4-isobutylamino 6-cyclopentylamino s-triazine
2-mercapto 4-(3'-butenylamino) 6-isopropylamino s-triazine
2-mercapto 4-pentylamino 6-cyclohexylamino s-triazine
2-mercapto 4-n-hexylamino 6-xenylamino s-triazine
2-mercapto 4-cyclohexenylamino 6-naphthylamino s-triazine
2-mercapto 4-chlorocyclopentylamino 6-toluido s-triazine
2-mercapto 4-bromotoluido 6-benzylamino s-triazine
2-mercapto 4-phenylchloroethylamino 6-phenethylamino s-triazine
2-mercapto 4-chloroanilino 6-ethylphenylamino s-triazine
2-mercapto 4-cyclohepthylamino 6-isopropylphenylamino s-triazine
2-mercapto 4-isopropylanilino 6-phenylpropylamino s-triazine
2-mercapto 4-dichloroanilino 6-chloroethylamino s-triazine
2-mercapto 4-amino 6-bromoethylamino s-triazine
2-mercapto 4-amino 6-methylamino s-triazine
2-mercapto 4-aminoanilino 6-ethylphenylamino s-triazine
2-mercapto 4-amino 6-benzylamino s-triazine Illustrative examples of sulfamyl-carbocyclic-carbamyl-alkyl halides and sulfamyl-carbocyclic-thiocarbamyl-alkyl halides that may be employed, depending upon the particular end-product sought, are:

Para-sulfamyl-phenyl-carbamyl chloro methane
Alpha -(para - sulfamyl-phenyl-carbamyl) beta-chloro ethane
Alpha-(meta-sulfamyl-phenyl-carbamyl) alpha-chloro ethane
Alpha - [para-(sulfonyl methylamide) - phenyl-thio-carbamyl] alpha-chloro pentane
Ortho - sulfonyl - phenyl - (methyl) - carbamyl bromo methane
Alpha - (4 - sulfamyl - naphthyl - [1]-carbamyl) beta-chloro 3'-butene
Alpha-(para-sulfamyl - chlorophenyl-carbamyl) alpha-ethyl beta-phenyl beta-bromo ethane
Para-(sulfonyl pentylamide)-tolyl-carbamyl cyclopentyl chloro methane
Para - (sulfonyl 3 - butenylamide) - chlorotolyl-(butyl)-carbamyl bromo methane
Para-(sulfonyl cyclohexylamide)-phenyl-(cyclopentyl)-thiocarbamyl chloro methane
Para - (sulfonyl phenylamide) - phenyl-(chloroethyl)-carbamyl bromo methane
4-(sulfonyl chlorotolylamide)-cyclohexyl-(phenyl)-carbamyl chloro methane
3 - sulfamyl - cyclopentyl - carbamyl tolyl chloro methane
Alpha - [para - (sulfonyl propylphenylamide)-phenyl-(bromo-phenyl)-thiocarbamyl] beta-chloro ethane
Alpha-[para-(sulfonyl phenylchloroethylamide)-phenyl-(xenyl)-carbamyl] alpha - chlorotolyl beta-chloro ethane
Ortho-(sulfonyl chloroethylamide)-phenyl-carbamyl chloro methane
Meta -(sulfonyl naphthylamide) - phenyl - carbamyl iodo methane
Para-sulfamyl-phenyl - carbamyl alpha-(bromophenyl) beta-chloro ethane
Para - (sulfonyl isobutylphenylamide) - phenyl-carbamyl naphthyl chloro methane Various hydrohalide acceptors may be employed. I prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates or inorganic bases, including the carbonates of alkali-metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino s-triazine and the sulfamyl-carbocyclic-carbamyl (or thiocarbamyl)-alkyl halide may be carried out in any suitable manner, but preferably is effected in the presence of a suitable solvent or mixture of solvents. Although various solvents and solvent mixtures may be employed, for economic reasons and because of their eminent suitability I prefer to use water or a mixture of water and alcohol. The reaction may be carried out under a variety of temperature and pressure conditions, for instance at normal or at elevated temperatures and at atmospheric, subatmospheric or super-atmospheric pressures. However, normal pressures and temperatures are preferred for convenience.

The above reaction may be represented by the following general equation:

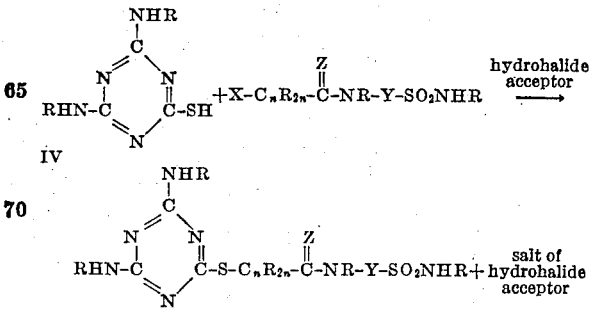

In the above equation X represents halogen, and $n$, Z, Y and R have the same meanings as given above with reference to Formula I.

The new chemical compounds of this invention also may be prepared by effecting reaction between a halogenated diamino s-triazine and a sulfamyl-carbocyclic-carbamyl or thiocarbamyl mercapto alkane in the presence of a hydrohalide acceptor. This reaction may be carried out by any suitable means but preferably is effected in the presence of an anhydrous solvent. An anhydrous solvent, e. g., alcohol, is desirable because one of the reactants, namely, the halogenated diamino s-triazine, is hydrolyzable. The other conditions of reaction may be the same as described above with reference to the first-mentioned method of preparation.

Illustrative examples of halogenated diamino s-triazines that may be used, depending on the end-product desired, are:

2-bromo 4,6-diamino s-triazine
2-chloro 4,6-diamino s-triazine
2-chloro 4,6-di-(methylamino) s-triazine
2-chloro 4,6-di-(anilino) s-triazine
2-bromo 4-amino 6-ethylamino s-triazine
2-chloro 4,6-di-(propylamino) s-triazine
2-bromo 4-allylamino 6-butylamino s-triazine
2-chloro 4-isobutylamino 6-cyclopentylamino s-triazine
2-chloro 4-(3'-butenylamino) 6-isopropylamino s-triazine
2-chloro 4-amylamino 6-cyclohexylamino s-triazine
2-chloro 4-n-hexylamino 6-xenylamino s-triazine
2-bromo 4-cyclohexenylamino 6-naphthylamino s-triazine
2-chloro 4-chlorocyclopentylamino 6-toluido s-triazine
2-chloro 4-bromotoluido 6-benzylamino s-triazine
2-chloro 4-phenylchloroethylamino 6-phenethylamino s-triazine
2-chloro 4-aminoanilino 6-ethylanilino s-triazine
2-chloro 4-chlorocycloheptylamino 6-isopropylphenylamino s-triazine
2-chloro 4-isopropylanilino 6-phenylpropylamino s-triazine
2-bromo 4-dichloroanilino 6-chloroethylamino s-triazine
2-iodo 4-amino 6-bromoethylamino s-triazine
2-iodo, 4,6-diamino s-triazine Illustrative examples of sulfamyl-carbocyclic-carbamyl or thiocarbamyl mercapto alkanes that may be used, depending upon the particular end-product desired, are:

Para-sulfamyl-phenyl-carbamyl mercapto methane
Alpha-(para-sulfamyl-phenyl-carbamyl) beta-mercapto ethane
Alpha-(meta-sulfamyl-phenyl-carbamyl) alpha mercapto ethane
Alpha-[para-(sulfonyl methylamine)-phenyl-thiocarbamyl] alpha-mercapto pentane
Ortho - sulfamyl-(methyl)-carbamyl mercapto methane
Alpha-(4-sulfamyl-naphthyl-[1]-carbamyl) beta mercapto 3'-butene
Alpha-(para-sulfamyl-chlorophenyl-carbamyl) alpha-ethyl beta-phenyl beta-mercapto ethane
Para-(sulfonyl pentylamide)-tolyl-carbamyl cyclopentyl mercapto methane
Para-(sulfonyl 3-butenylamide)-chlorotolyl-(butyl)-carbamyl mercapto methane
Para-(sulfonyl cyclohexylamide)-phenyl-cyclopentyl)-thiocarbamyl mercapto methane
Para-(sulfonyl phenylamide)-phenyl-(chloroethyl)-carbamyl mercapto methane
4-(sulfonyl chlorotolylamide)-cyclohexyl-(phenyl)-carbamyl mercapto methane
Alpha-[para-(sulfonyl propylphenylamide)-phenyl-(bromophenyl)-thiocarbamyl] beta-mercapto ethane
Alpha-[para-(sulfonyl phenylchloroethylamide)-phenyl-(xenyl)-carbamyl] alpha-chlorotolyl beta-mercapto ethane
Meta-(sulfonyl naphthylamide)-phenyl-carbamyl mercapto methane
Ortho-(sulfonyl chloroethylamide)-phenyl-carbamyl mercapto methane
Para-sulfamyl-phenyl-carbamyl alpha-(bromophenyl) beta-mercapto methane
Para-(sulfonyl butylphenylamide)-phenyl-carbamyl naphthyl mercapto methane
Alpha-[(sulfonyl isopropylamide)-cyclohexenyl-(methyl)-carbamyl] alpha, beta-di-(phenyl) alpha-methyl beta-chlorobutyl beta-mercapto ethane The hydrohalide acceptor may be the same as described above with reference to the first-named method of preparing the compounds of this invention.

The general reaction for this alternative method of preparing my new chemical compounds is illustrated by the following equation:

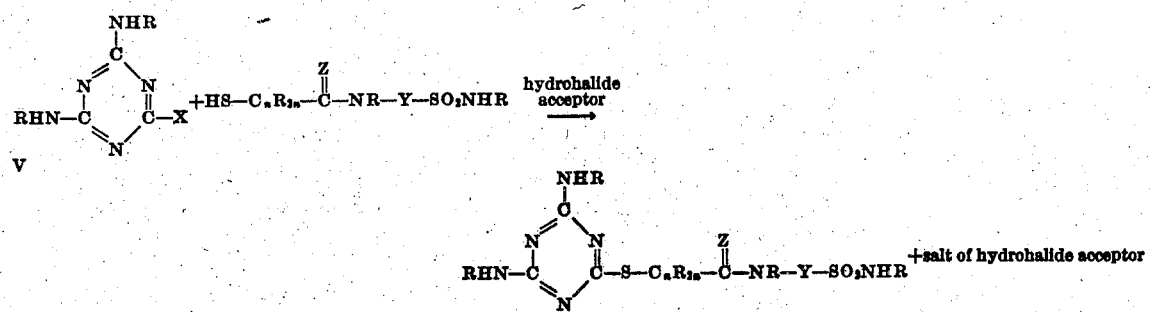

In the above equation X represents halogen, and $n$, Z, Y and R have the same meanings as given above with reference to Formula I.

In order that those skilled in the art better may understand how the present invention may be carried into effect, the following illustrative examples are given. All parts are by weight.

*Example 1*

This example illustrates the preparation of 4,6-diamino s-triazinyl-2 para-sulfamyl-phenylcarbamyl-methyl sulfide, the formula for which is:

VI

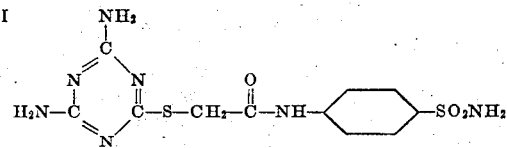

This compound also may be named 2,6-diamino s-triazinyl-4 para-sulfamyl-phenyl-carbamyl-methyl sulfide or 2,4-diamino s-triazinyl-6 para-sulfamyl-phenyl-carbamyl-methyl sulfide.

|  | Parts |
|---|---|
| Thioammeline | 97.7 |
| Sodium hydroxide | 28.1 |
| Para - sulfamyl - phenyl - carbamyl chloro methane | 170.0 |

The thioammeline was dissolved in 600 parts water containing the stated amount of sodium hydroxide. The mixture was heated on a steam plate until solution was effected. To the clear, hot solution the stated amount of para-sulfamyl-phenyl-carbamyl chloro methane was added with stirring over a period of 30 minutes. The resulting solution was allowed to stand at room temperature for several days. The precipitate comprising 4,6-diamino s-triazinyl-2 para-sulfamyl-phenyl-carbamyl-methyl sulfide was filtered from the solution and recrystallized from water. An additional amount of sulfide was recovered from the filtrate. The impure sulfides were washed free of water-soluble salts.

*Example 2*

4,6 - diamino s - triazinyl - 2 para - sulfamyl-phenyl-thiocarbamyl-methyl sulfide is produced in the same manner as described under Example 1 with the exception that, instead of para-sulfamyl-phenyl-carbamyl chloro methane, an equivalent amount of para-sulfamyl-phenyl-thiocarbamyl chloro methane is employed.

*Example 3*

4,6-diamino s-triazinyl-2 para-sulfamyl-tolyl-carbamyl-methyl sulfide is produced in the same manner as described under Example 1 with the exception that, instead of para-sulfamyl-phenyl-carbamyl chloro methane, an equivalent amount of para-sulfamyl-tolyl-carbamyl chloro methane is employed.

Other examples of the new chemical compounds of this invention are shown below:

VII

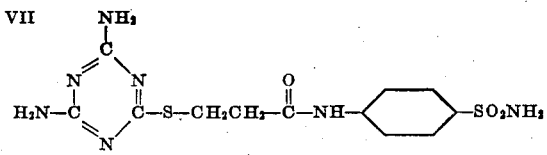

4,6-diamino s-triazinyl-2 beta-(para-sulfamyl-phenyl-carbamyl-ethyl) sulfide

VIII

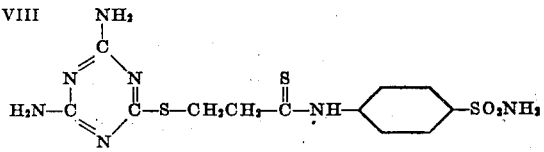

4,6-diamino s-triazinyl-2 beta-(para-sulfamyl-phenyl-thiocarbamyl-ethyl) sulfide

IX

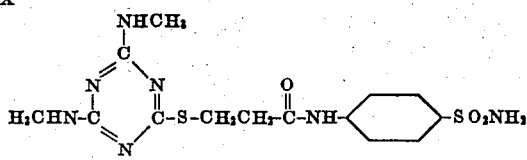

4,6-di-(methylamino) s-triazinyl-2 beta-(parasulfamyl-phenyl-carbamyl-ethyl) sulfide

X

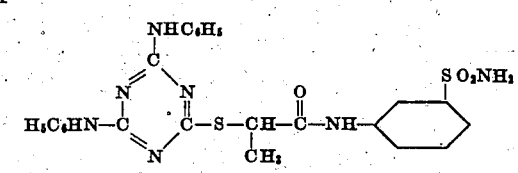

4,6-di-(anilino) s-triazinyl-2 alpha-(meta-sulfamyl-phenyl-carbamyl ethyl) sulfide

XI

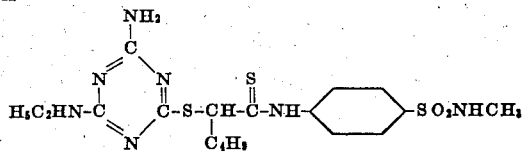

6-amino 4-ethylamino s-triazinyl-2 alpha-[(para-sulfonyl methylamide)-phenyl-thiocarbamyl-pentyl] sulfide

XII

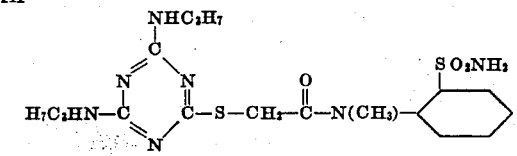

4,6-di-(propylamino) s-triazinyl-2 ortho-sulfamyl-phenyl-(methyl)-carbamyl-methyl sulfide

XIII

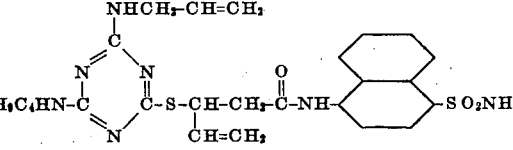

4-allylamino 6-butylamino s-triazinyl-2 beta-(4'-sulfamyl-naphthyl-[1']-carbamyl-3''-butenyl) sulfide

XIV

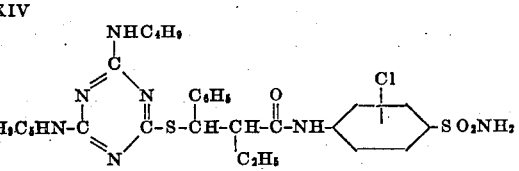

4-butylamino 6-cyclopentylamino s-triazinyl-2 beta-[para-sulfamyl-chlorophenyl-carbamyl-(alpha-ethyl beta-phenyl)-ethyl] sulfide

XV

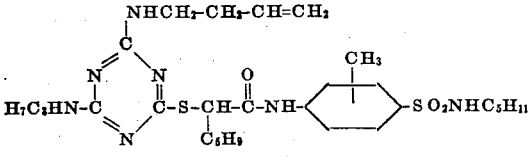

4-(3-butenylamino) 6-propylamino s-triazinyl-2 para-(sulfonyl amylamide)-tolyl-carbamyl-cyclopentyl-methyl sulfide XVI
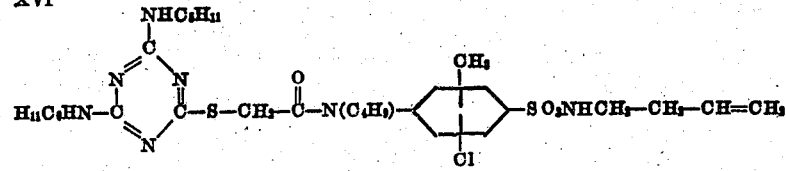
4-amylamino 6-cyclohexylamino s-triazinyl-2 para-(sulfonyl 3'-butenylamide)-chlorotolyl-(butyl)-carbamyl-methyl sulfide XVII
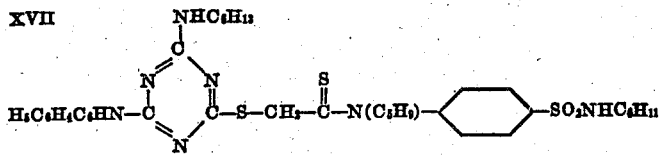
4-hexylamino 6-xenylamino s-triazinyl-2 para-(sulfonyl cyclohexyl-amide)-phenyl-(cyclopentyl)-thiocarbamyl-methyl sulfide XVIII
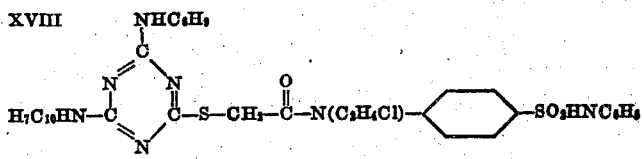
4-cyclohexenylamino 6-naphthylamino s-triazinyl-2 para-(sulfonyl phenylamide)-phenyl-(chloroethyl)-carbamyl-methyl sulfide XIX
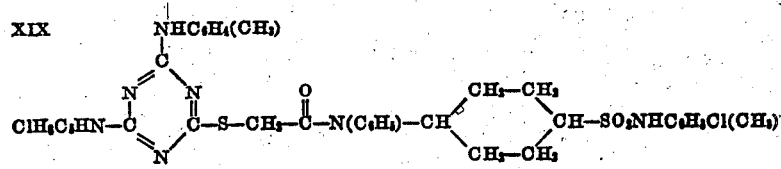
4-chlorocyclopentylamino 6-toluido s-triazinyl-2 (4'sulfonyl chloro-tolylamide)-cyclohexyl-(phenyl)-carbamyl-methyl sulfide XX
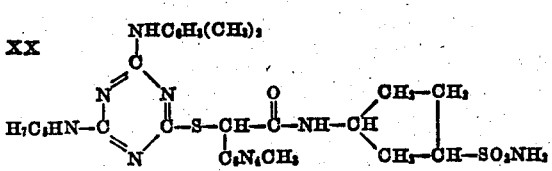
4-cyclopentenylamino 6-xylidino s-triazinyl-2 3'-sulfamyl-cyclo-pentyl-carbamyl-(tolyl)-methyl sulfide XXI
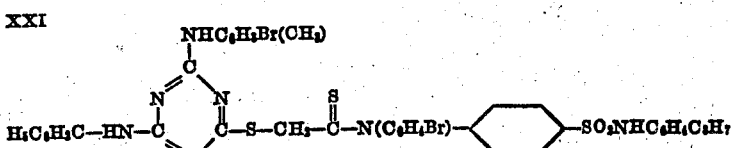
4-bromotoluido 6-benzylamino s-triazinyl-2 beta-[(para-sulfonyl propylphenylamide)-phenyl-(bromophenyl)-thiocarbamyl-ethyl] sulfide XXII
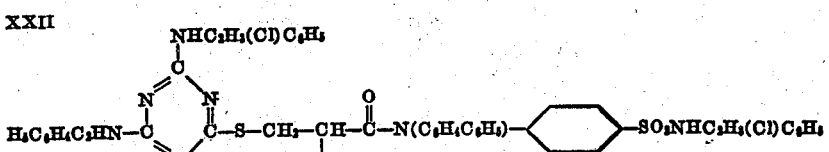
4-phenylchloroethylamino 6-phenethylamino s-triazinyl-2 beta-[(para-sulfonyl phenylchloroethyla-amide)-phenyl-(xenyl)-carbamyl-(alpha-chlorotolyl)-ethyl] sulfide XXIII
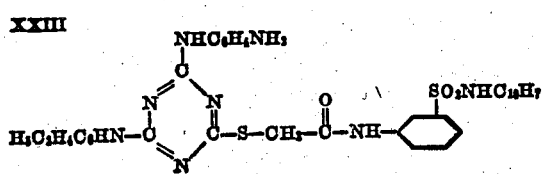

XXIV 4-aminoanilino 6-ethylanilino s-triazinyl-2 meta-(sulfonyl naphthylamide)-phenyl-carbamyl-methyl sulfide

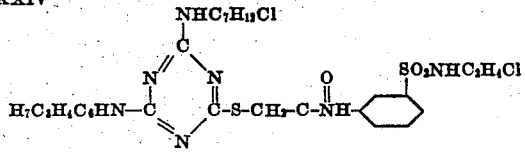

XXV 4-(chlorocycloheptylamino) 6-propylphenylamino s-triazinyl-2 meta-(sulfonyl chloroethylamide)-phenyl-carbamyl-methyl sulfide

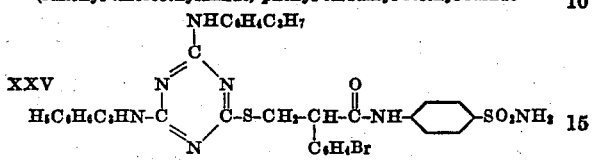

XXVI 4-propylanilino 6-phenylpropylamino s-triazinyl-2 beta-[para-sulfamyl-phenyl-carbamyl-(alpha-bromophenyl)-ethyl] sulfide

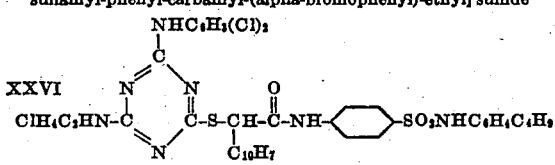

4-dichloroanilino 6-chlorethylamino s-triazinyl-2 para-(sulfonyl butylphenylamide)-phenyl-carbamyl-(naphthyl)-methyl sulfide XXVII 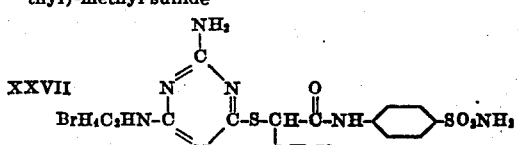

4-bromoethylamino 6-amino s-triazinyl-2 alpha-(para-sulfamyl-phenyl-carbamyl-chlorobutyl) sulfide XXVIII 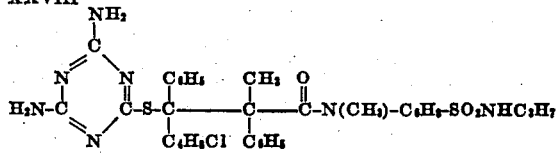

4,6-diamino s-triazinyl-2 (sulfonyl propylamide)-cyclohexenyl-(methyl)-carbamyl-(alpha, beta-diphenyl alpha-methyl beta-chlorobutyl)-ethyl sulfide XXIX 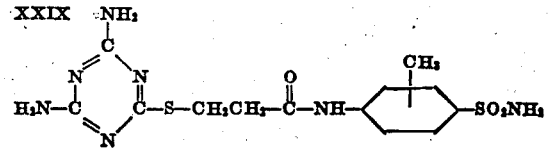

4,6-diamino s-triazinyl-2 beta-(para-sulfamyl-tolyl-carbamyl-ethyl) sulfide

XXX 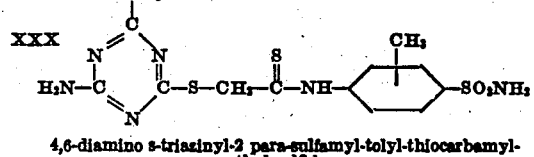

4,6-diamino s-triazinyl-2 para-sulfamyl-tolyl-thiocarbamyl-methyl sulfide

XXXI 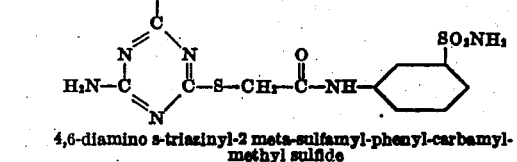

4,6-diamino s-triazinyl-2 meta-sulfamyl-phenyl-carbamyl-methyl sulfide

XXXII 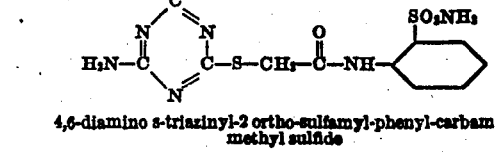

4,6-diamino s-triazinyl-2 ortho-sulfamyl-phenyl-carbamyl-methyl sulfide

In a manner similar to that described above with particular reference to the diamino [(—NHR)₂] s-triazinyl sulfamyl-carbocyclic-carbamyl-alkyl sulfides, corresponding derivatives of the asymmetrical and vicinal triazines may be prepared. It also will be understood by those skilled in the art from the foregoing description of the preparation of a triazine monosulfide

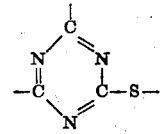

that similar compounds may be prepared in which two or three sulfur atoms are attached directly to a carbon atom of the triazine nucleus, thus:

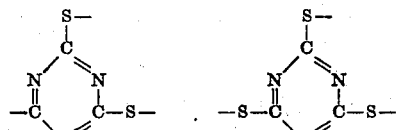

What I claim as new and desire to secure by Letters Patent of the United States is:

1. Chemical compounds corresponding to the general formula

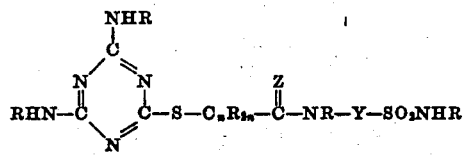

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals.

2. Chemical compounds as in claim 1 wherein R represents hydrogen.

3. Chemical compounds as in claim 1 wherein R represents hydrogen, Z represents oxygen and $n$ is 1.

4. Chemical compounds corresponding to the general formula

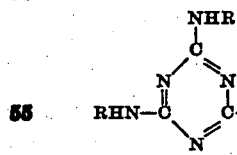

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals.

5. Chemical compounds corresponding to the general formula

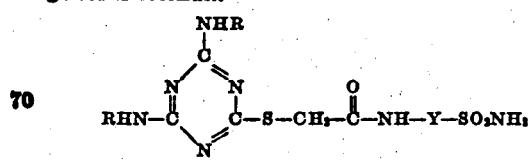

where Y represents a divalent carbocyclic radical, and R represents a member of the class consisting of hydrogen and monovalent hydrocarbon and halo-hydrocarbon radicals.

6. A diamino s-triazinyl sulfamyl-carbocyclic-carbamyl-methyl sulfide.

7. A diamino s-triazinyl sulfamyl-phenyl-carbamyl-methyl sulfide.

8. Diamino s-triazinyl para-sulfamyl-phenyl-carbamyl-methyl sulfide.

9. A diamino s-triazinyl sulfamyl-tolyl-carbamyl-methyl sulfide.

10. A diamino s-triazinyl sulfamyl-carbocyclic-thiocarbamyl-methyl sulfide.

11. A diamino s-triazinyl sulfamyl-phenyl-thiocarbamyl-methyl sulfide.

12. The method of preparing chemical compounds corresponding to the general formula

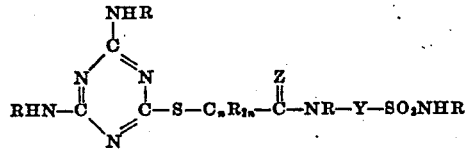

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals, said method comprising effecting reaction, in the presence of a hydrohalide acceptor, between (1) a mercapto triazine corresponding to the general formula

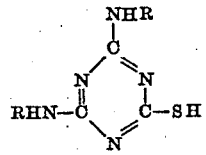

where R has the meaning above given, and (2) a halide corresponding to the general formula

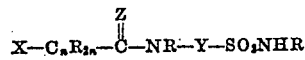

where X represents halogen, and $n$, Z, Y and R have the meanings above given.

13. A method as in claim 12 wherein the hydrohalide acceptor is an alkali-metal hydroxide.

14. A method of preparing diamino s-triazinyl para-sulfamyl-phenyl-carbamyl-methyl sulfide which comprises effecting reaction, in the presence of a hydrohalide acceptor, between thioammeline and para-sulfamyl-phenyl-carbamyl chloro methane.

GAETANO F. D'ALELIO.

Certificate of Correction

Patent No. 2,312,692.    March 2, 1943.

GAETANO F. D'ALELIO

It is hereby certified that errors appear in the printed specification of the above numbered patent requiring correction as follows: Page 1, first column, line 42, for "zenyl" read *xenyl*; and second column, lines 5 to 8 inclusive, for that portion of the formula reading

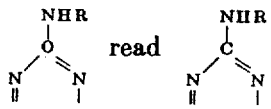

page 2, first column, lines 3 and 4, for "Nov. 11, 1941" read *Nov. 1, 1941*; line 7, for "synethetic" read *synthetic*; line 14, for "triocarbamyl" read *thiocarbamyl*; line 45, for "4-cyclohepthylamino" read *4-cycloheptylamino*; and second column, line 36, for "or" after "carbonates" read *of*; page 3, first column, line 68, after "2-iodo" strike out the comma; and second column, line 5, for "methylamine" read *methylamide*; line 10, for "beta mercapto" read *beta-mercapto*; line 17, for "phenyl-cyclo-" read *phenyl-(cyclo-*; page 4, second column, line 20, Formula X, after "carbamyl" insert a hyphen; line 74, Formula XV, for "4-(3-butenylamino)" read *4-(3'-butenylamino)*; page 5, Formula XVIII, for the portion thereof reading "SO₂HNC₆H₅" read *SO₂NHC₆H₅*; Formula XIX, name of compound appearing below said formula, for "(4'sulfonyl" read *(4'-sulfonyl*; Formula XX, bottom line thereof, for "C₆N₄CH₃" read *C₆H₄CH₃*; Formula XXI, for

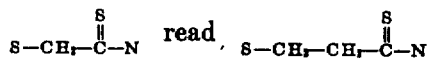

page 6, first column, lines 6-7, Formula XXIV, for

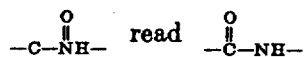

line 17, Formula XXV, for "para-2" read *para-*; and that the said Letters Patent should be read with these corrections therein that the same may conform to the record of the case in the Patent Office.

Signed and sealed this 8th day of June, A. D. 1943.

[SEAL]

HENRY VAN ARSDALE,
*Acting Commissioner of Patents.*